(12) United States Patent
Thomas (10) Patent No.: US 7,192,007 B2
(45) Date of Patent: Mar. 20, 2007

(54) JACK ADAPTER

(76) Inventor: Bruce Thomas, 640 S. 300 W., Heyburn, ID (US) 83336

( * ) Notice: Subject to any disclaimer, the term of this patent is extended or adjusted under 35 U.S.C. 154(b) by 134 days.

(21) Appl. No.: 11/112,184

(22) Filed: Apr. 22, 2005

(65) Prior Publication Data

US 2006/0237700 A1    Oct. 26, 2006

(51) Int. Cl.
*B66F 3/00* (2006.01)
(52) U.S. Cl. .................................. 254/133 R
(58) Field of Classification Search ........... 254/134, 254/133 R, 1, DIG. 4, 100
See application file for complete search history.

(56) References Cited

U.S. PATENT DOCUMENTS

| | | | |
|---|---|---|---|
| 4,419,038 A | 12/1983 | Pendergraft | |
| 4,558,848 A | 12/1985 | Rutter | |
| 4,635,983 A | 1/1987 | Boland et al. | |
| 5,211,536 A * | 5/1993 | Ackerman et al. | 415/177 |
| 6,203,078 B1 | 3/2001 | Karrer | |
| 6,612,615 B1 * | 9/2003 | Dimand | 280/769 |

* cited by examiner

*Primary Examiner*—Robert C. Watson
(74) *Attorney, Agent, or Firm*—Joseph W. Holland (57) ABSTRACT

A jack adapter for connecting a jack to a vehicle including a trailer hitch having a tubular cross member and/or a towing lug of a vehicle to provide alternate locations at which a jack may be connected to a vehicle.

15 Claims, 8 Drawing Sheets

JACK ADAPTER

BACKGROUND OF THE INVENTION

1. Technical Field

The present invention relates generally to devices for lifting and more specifically, to an adapter that is placed between a jack and a lifting point located on a vehicle.

2. Background of the Invention

A variety of lifting means for vehicles are described in the prior art. U.S. Pat. No. 4,419,038 to Pendergraft entitled Bumper Mounted Foldable Crane Hoist discloses a pair of screw operated outrigger jacks, each including a lug that slips into a receiver in a rear hoist support. U.S. Pat. No. 4,635,983 to Boland, et al. entitled Rear Bumper Assembly for Cable Pulling Truck discloses a cable pulling truck having a rear bumper assembly secured to the vehicle frame. The bumper assembly includes two laterally extensible telescoping outrigger supports, each carrying at its outer end an upstanding vertical support tube for receiving therein the shaft of an associated winch motor in its use configuration. Each outrigger also carries a hand-operated jack assembly for supporting the vehicle on the ground, each jack assembly being pivotally movable between storage and use conditions. U.S. Pat. No. 6,203,078 to Karrer entitled Bumper for Utility Vehicle discloses a bumper for a pickup truck or other utility vehicle including a jack that inserts into a tubular receiver that pins to the bumper. The prior art also discloses at least one jack adapter. U.S. Pat. No. 4,558,848 to Rutter entitled Jack Adapter discloses a jack adapter including a cylindrical rod having a recess formed in one end for indexing the end to a jack centering projection of a vehicle and a threaded aperture formed in an opposite end. The rod has a length selected to extend at least the distance between the jack support surface and the lower surface of an accessory running board mounted to the vehicle and a threaded fastener is employed for securing the rod to the accessory jack for the vehicle. The prior art also discloses attaching accessory items to a trailer hitch. U.S. Pat. No. 6,612,615 to Dimand entitled Trailer Hitch Cart Attachment Mechanism discloses a cart carrier attached to a vehicle trailer hitch.

Late model vehicles including a variety of passenger and utility vehicles include bumpers which, while serving the purpose of resisting impact, do not provide a point at which a lift engagement element of a jack may be placed for the purpose of lifting a corner of the vehicle, for instance to remove a tire. In most cases these vehicles provide one or more locations, typically on the frame of the vehicle, at which a specialty jack may be attached.

While employing a jack that requires attachment to the vehicle at limited or prescribed locations may be acceptable in some circumstances, it may often be inconvenient for an individual to access the location at which a jack is intended by the manufacturer to be attached to the vehicle. Alternately, the jack intended for use with a particular vehicle may be lost and an alternate jack used. In other situations, particularly with trucks or other utility vehicles that are designed to haul substantial loads, an operator may desire to use a jack having a capacity that is greater than that of the jack provided with the vehicle.

In any of these situations the front or rear bumpers may not be configured to provide an adequate point of purchase at which the jack might engage the vehicle. Many vehicles however include a towing hitch, typically located at the rear of the vehicle. Frame mounted towing hitches typically include a cross-frame member that extends between and attaches to at least two points on the vehicle frame. Additionally, many vehicles include one or more towing lugs commonly affixed to the frame and extending to the front or the rear of the vehicle.

Advantage may therefore be found in providing a device which adapts a jack to engage a structural member of a trailer hitch that attaches to a frame of a vehicle. Additional advantage may be found in providing an apparatus that adapts a jack to engage a towing lug of a vehicle. Advantage may also be found in providing a combination device that provides a device which adapts a jack to engage a structural member of a trailer hitch that attaches to a frame of a vehicle and a device that adapts a jack to engage a towing lug of a vehicle, allowing the user to determine which adapter is best suited for a particular application.

SUMMARY OF THE INVENTION

These and other objectives are met by the jack adapter of the present invention. As such, the present invention is directed to a trailer hitch crossbar jack adapter for connecting a jack including a lift engagement element to a vehicle having a trailer hitch, the trailer hitch including a tubular cross member. The trailer hitch crossbar jack adapter includes an adapter arm including a first end and a second end, the first end of the adapter arm is configured to engage the lift engagement element of the jack. A first cross member engagement foot is connected to and extends from the second end of the adapter arm at an angle. The first cross member engagement foot includes a first tubular cross member engagement end adapted for engagement with the trailer hitch tubular cross member.

In the preferred embodiment, the trailer hitch crossbar jack adapter includes a generally "T" shaped configuration although other configurations are contemplated so long as the device includes an adapter arm configured to engage a lift engagement element of the jack and a cross member engagement foot adapted for engagement with the trailer hitch tubular cross member. One such configuration may be characterized as a generally "L" shaped configuration.

Alternately, the present invention is also directed to a towing lug jack adapter. The towing lug adapter includes a towing lug jack adapter tubular section having a towing lug eye engagement element attached to and extending from the towing lug jack adapter tubular section, the towing lug eye engagement element includes an aperture formed through the lug eye engagement element through which a pin may be inserted for restricting pullout of the towing lug eye engagement element from the eye of a towing lug. The towing lug jack adapter may be removably coupled to the trailer hitch crossbar jack adapter.

In a preferred embodiment of the present invention, a combination jack adapter. The combination jack adapter includes a trailer hitch crossbar jack adapter and a towing lug adapter portion removably attached to the trailer hitch crossbar jack adapter. The trailer hitch crossbar jack adapter allows connection of a jack including a lift engagement element to a vehicle having a trailer hitch that includes a tubular cross member. The towing lug adapter portion facilitates connecting a jack including a lift engagement element to a vehicle a towing lug.

The present invention consists of the parts hereinafter more fully described, illustrated in the accompanying drawings and more particularly pointed out in the appended claims, and methods for laying consecutive lengths pipe using an pipe installation device, it being understood that changes may be made in the form, size, proportions and minor details of construction without departing from the spirit or sacrificing any of the advantages of the invention.

DETAILED DESCRIPTION

Referring to FIGS. 1–7, combination jack adapter 10 according to a preferred embodiment of the present invention is shown.

Figure 1:
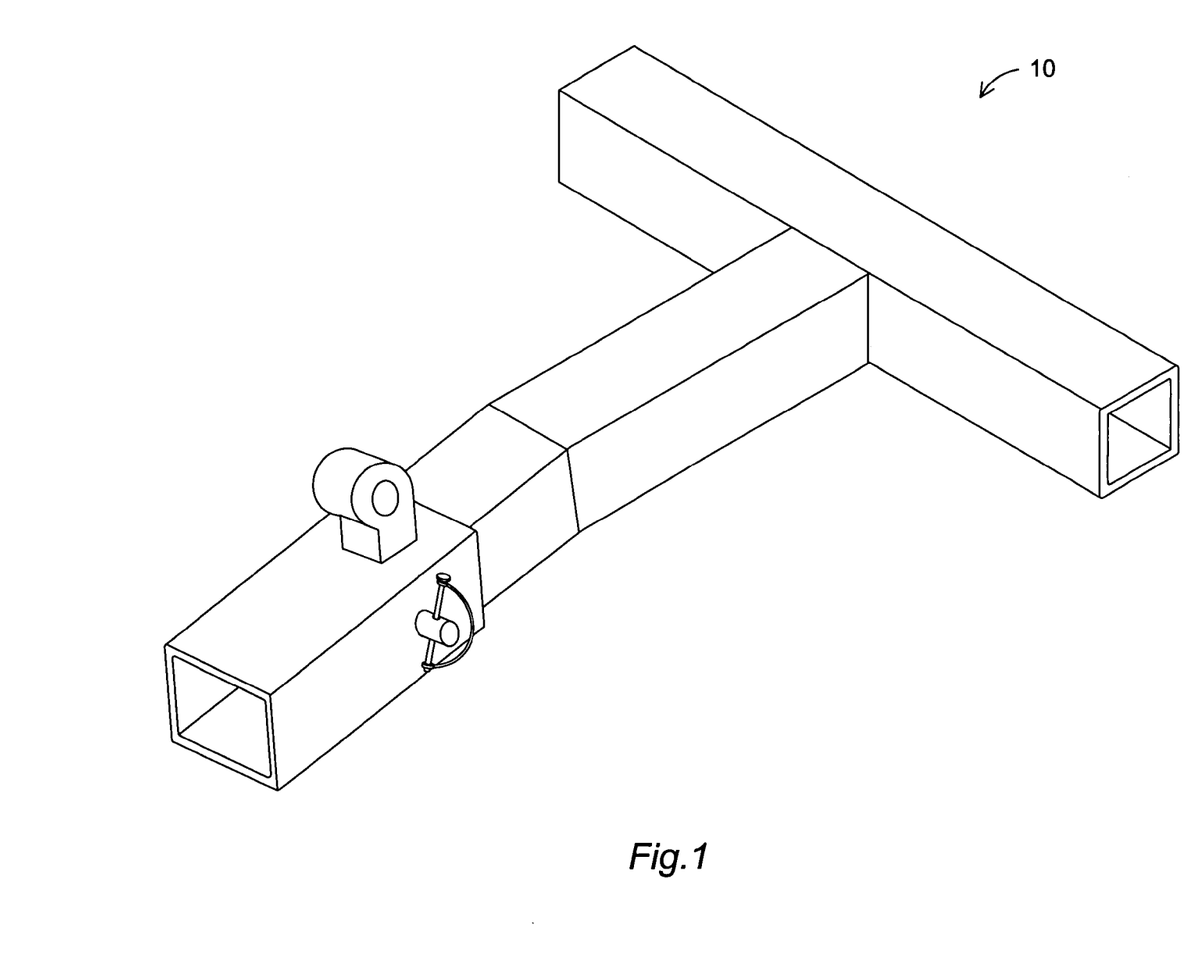
FIG. 1 is a rear perspective representation of a combination jack adapter according to a preferred embodiment of the present invention.
Figure 2:
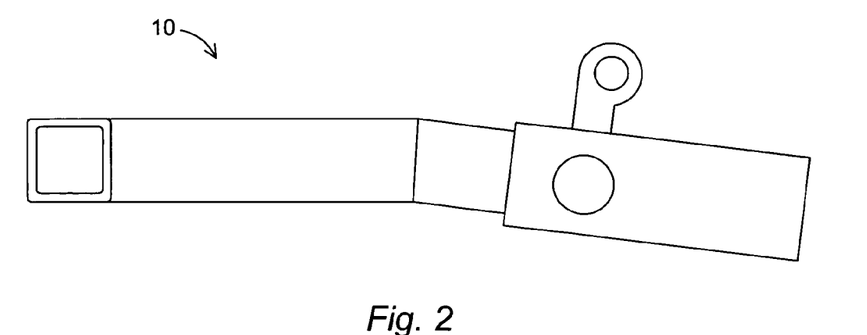
FIG. 2 is a representative first side view of a combination jack adapter according to a preferred embodiment of the present invention.
Figure 3:
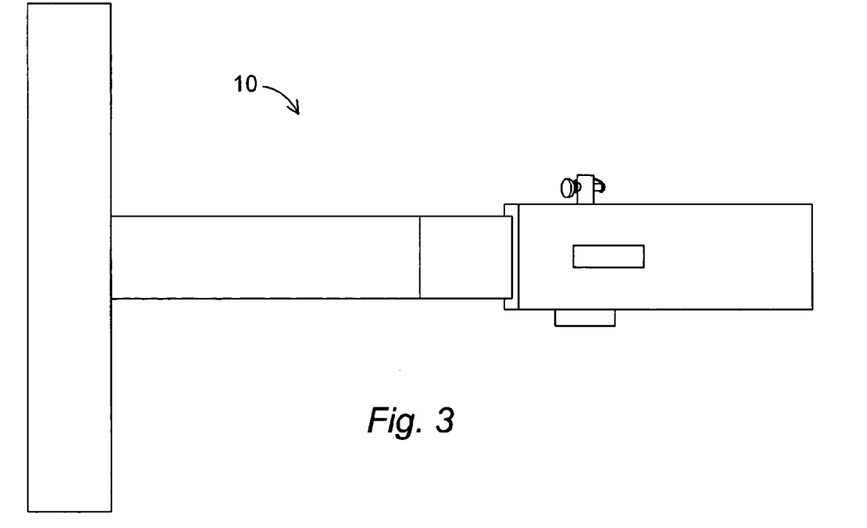
FIG. 3 is a representative top view of a combination jack adapter according to a preferred embodiment of the present invention.
Figure 4:
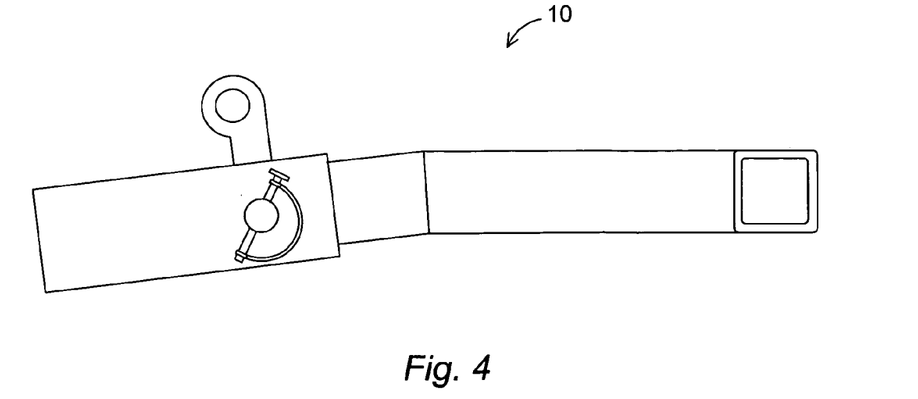
FIG. 4 is a representative second side view of a combination jack adapter according to a preferred embodiment of the present invention.
Figure 5:
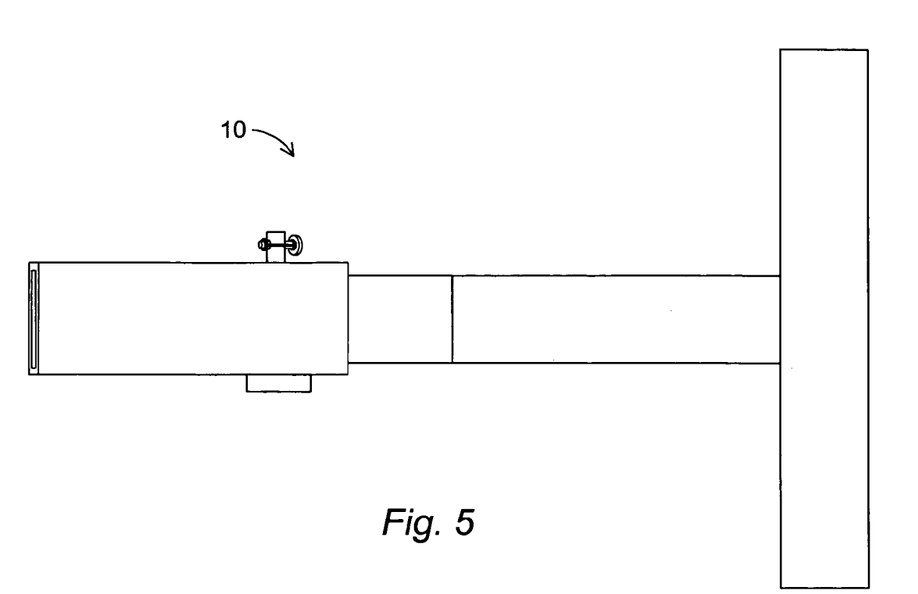
FIG. 5 is a representative bottom view of a combination jack adapter according to a preferred embodiment of the present invention.
Figure 6:
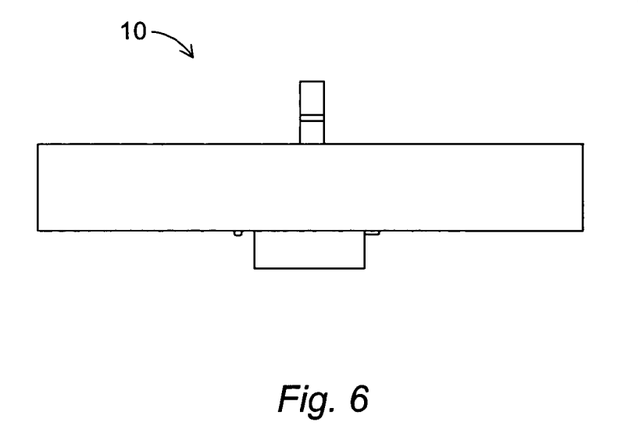
FIG. 6 is a representative front view of a combination jack adapter according to a preferred embodiment of the present invention.
Figure 7:
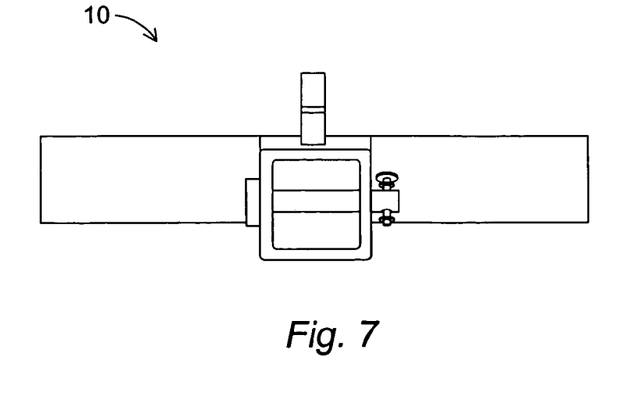
FIG. 7 is a representative rear view of a combination jack adapter according to a preferred embodiment of the present invention.
Figure 8:
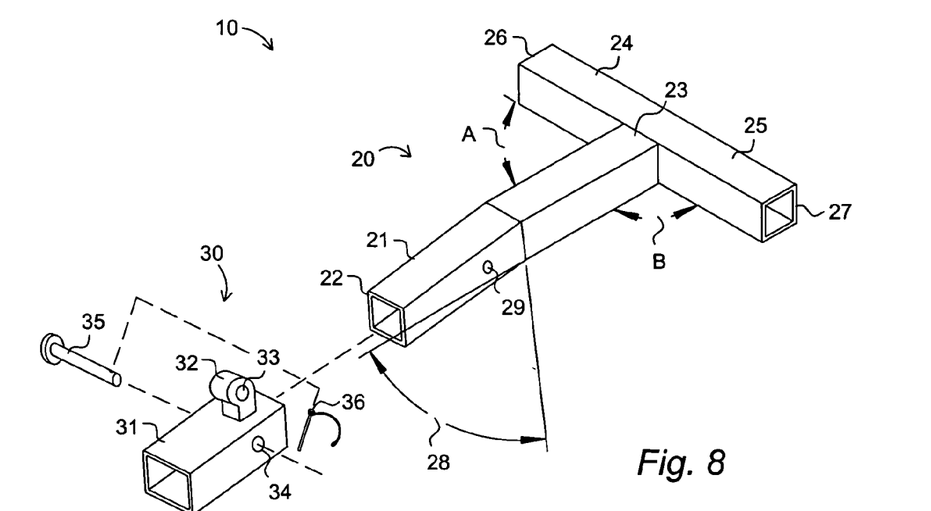
FIG. 8 is an rear perspective representation of a combination jack adapter according to a preferred embodiment of the present invention.

FIG. 8 shows combination jack adapter 10 including trailer hitch jack adapter 20 and towing lug adapter portion 30. Trailer hitch jack adapter 20 includes tubular adapter arm 21 including first end 22 and second end 23. First cross member engagement foot 24 is connected to and extends from second end 23 of adapter arm 21 at an angle A and second cross member engagement foot 25 is connected to and extends from second end 23 of adapter arm 21 at an angle B. First cross member engagement foot 24 includes first trailer hitch tubular cross member engagement end 26. Second cross member engagement foot 25 includes second trailer hitch tubular cross member engagement end 27. First end 22 and second end 23 are offset by angle 28.

FIG. 8 also shows towing lug adapter portion 30 which may be coupled to adapter arm 21 for purposes of storage or transport or when used to adapt a jack to a trailer hitch cross bar as discussed herein below. Towing lug adapter portion 30 includes towing lug jack adapter tubular section 31. Towing lug eye engagement element 32 is attached to and extends from towing lug jack adapter tubular section 31. Towing lug eye engagement element 32 includes aperture 33 formed through lug eye engagement element 32. Pin 35, including retainer pin and bale 36, is insertable through aligned apertures 34 formed in towing lug jack adapter tubular section 31 and aperture 29 formed in adapter arm 21. Pin 35 is alternately insertable through aperture 33 of lug eye engagement element 32.

Figure 9A:
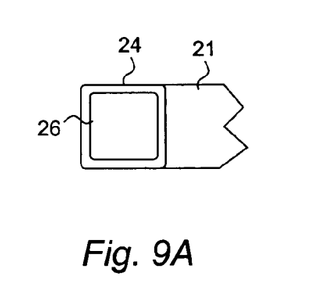
FIGS. 9A–9D are representative cross-sections of a cross member engagement foot of a trailer hitch crossbar jack adapter according to various preferred embodiments of the present invention.
Figure 9B:
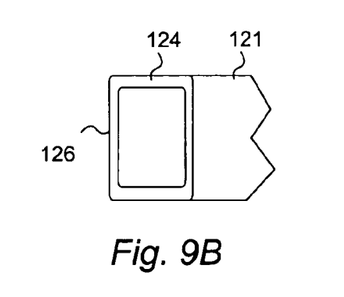
Figure 9C:
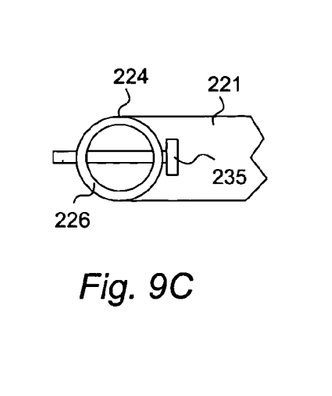
Figure 9D:
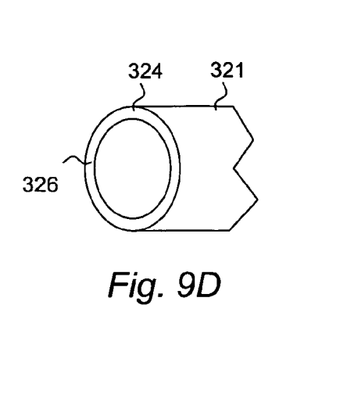

FIGS. 9A–9D show alternate cross-sections for cross member engagement feet. The cross-sectional configuration of any particular cross member engagement foot would be determined by the cross-section of a particular trailer hitch tubular cross member. FIG. 9A depicts a substantially square first cross member engagement foot 24 attached to adapter arm 21, first cross member engagement foot 24 including a substantially square first trailer hitch tubular cross member engagement end 26. FIG. 9B depicts a rectangular first cross member engagement foot 124 attached to adapter arm 121, first cross member engagement foot 124 including a rectangular first trailer hitch tubular cross member engagement end 126. FIG. 9C depicts a substantially round first cross member engagement foot 224 attached to adapter arm 221, first cross member engagement foot 224 including a substantially round first trailer hitch tubular cross member engagement end 226. In the embodiment shown in FIG. 9C, pin 235 is insertable through an aperture, (not shown), to prevent adapter arm 221 from rolling during use. Retainer pin and bale 236 may be inserted through pin 235 to prevent unwanted withdrawal of pin 235. FIG. 9D depicts first cross member engagement foot 324 including an elliptical cross-section. First cross member engagement foot 324 is attached to adapter arm 321, first cross member engagement foot 324 including an elliptical first trailer hitch tubular cross member engagement end 326.

Figure 10A:
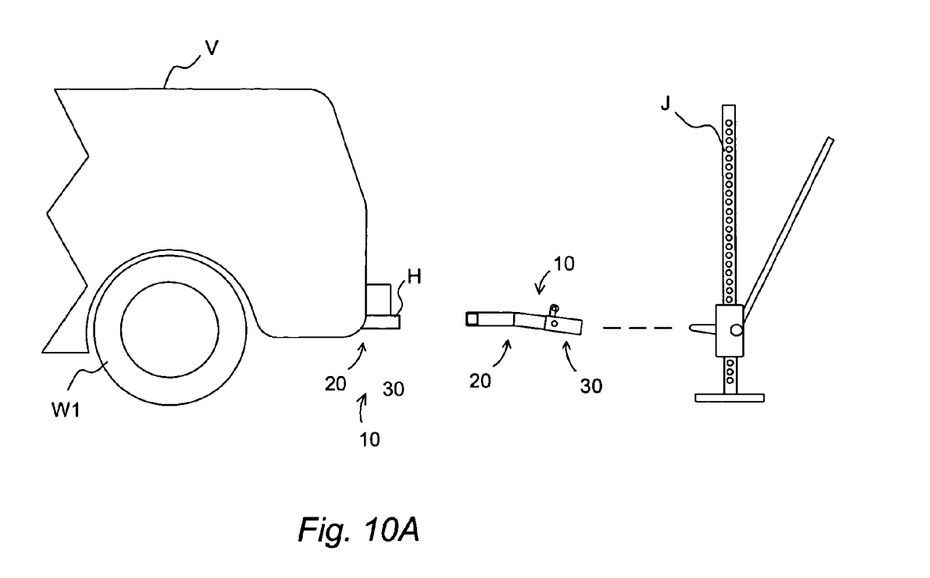
FIG. 10A is a representative side view of a combination jack adapter according to a preferred embodiment of the present invention shown engaging a trailer hitch of a vehicle.
Figure 10B:
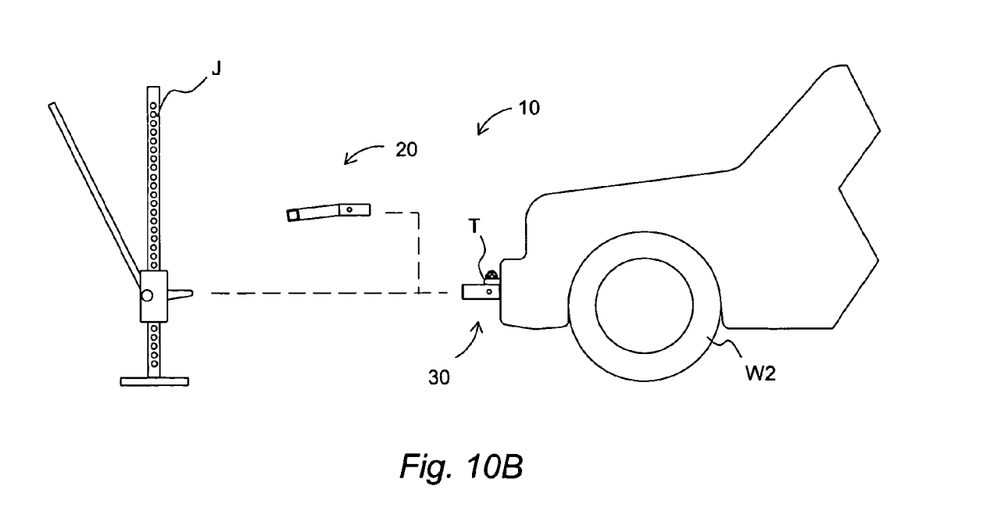
FIG. 10B is a representative side view of a combination jack adapter according to a preferred embodiment of the present invention shown engaging a towing lug of a vehicle.

Referring to FIG. 10A, vehicle V is shown including trailer hitch H. Combination jack adapter 10 including trailer hitch crossbar jack adapter 20 and towing lug adapter portion 30 is shown being positioned to engage jack J for lifting wheel W1. In FIG. 10B, vehicle V is shown including towing lug T. Combination jack adapter 10 including trailer hitch crossbar jack adapter 20 and towing lug adapter portion 30. For attachment to towing lug T, towing lug adapter portion 30 is separated from trailer hitch crossbar jack adapter 20. Towing lug adapter portion 30 then engages jack J and towing lug T for lifting wheel W2.

Figure 11:
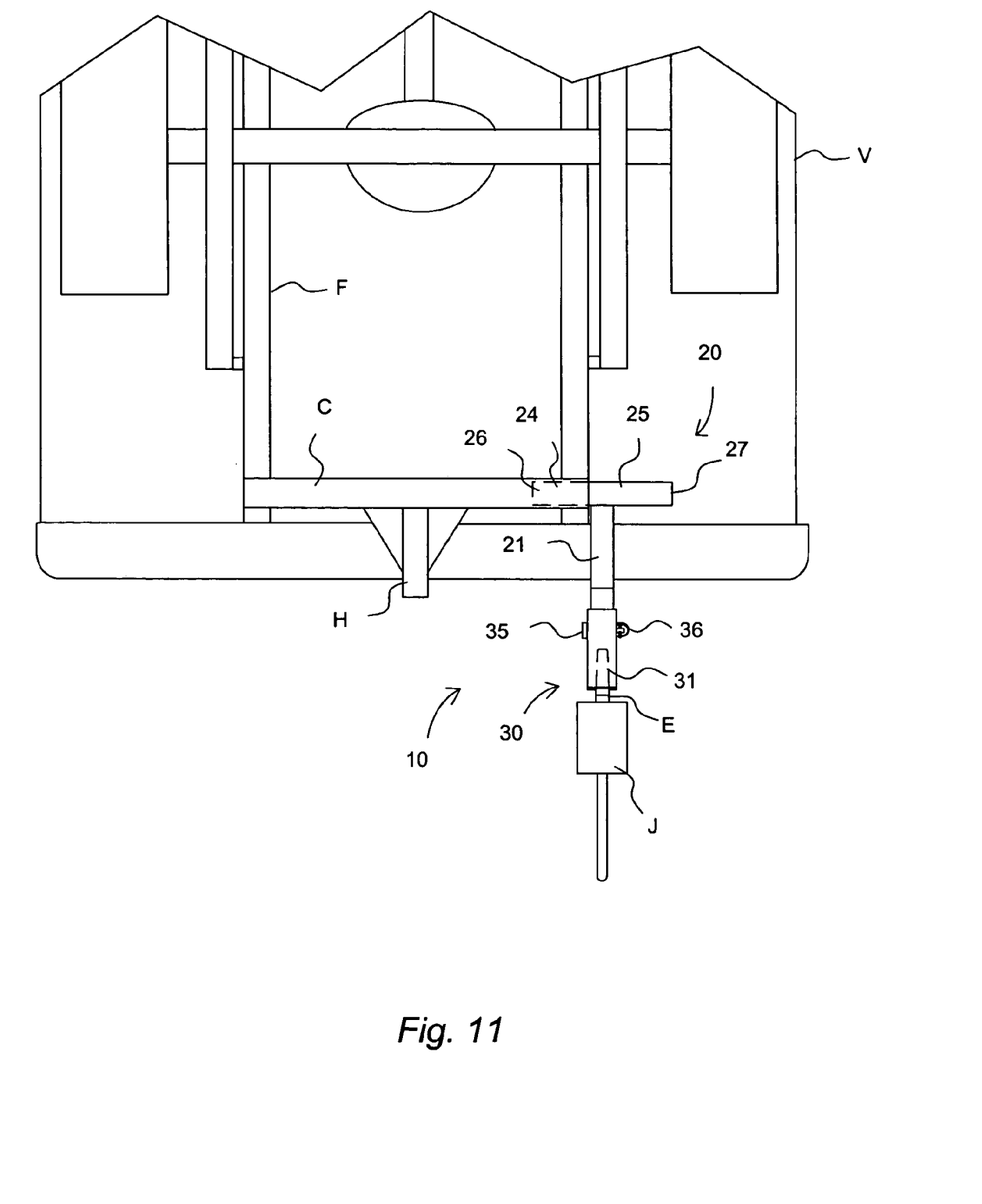
FIG. 11 is a representative bottom view showing use of combination jack adapter including trailer hitch crossbar jack adapter according to a preferred embodiment of the present invention.

Referring to FIG. 11, vehicle V is shown in a bottom cutaway section. Vehicle V includes frame F, to which trailer hitch H having tubular cross member C, is attached. Tubular cross member C is shown affixed to frame F of vehicle V. In the embodiment shown, tubular cross member C is configures as a substantially square tubular member. Combination jack adapter 10 is shown including trailer hitch jack adapter 20 and towing lug adapter portion 30. Towing lug adapter portion 30 is shown coupled to adapter arm 21 by removing retainer pin and bale 36 and pin 35. Towing lug adapter portion 30 includes towing lug jack adapter tubular section 31. Trailer hitch jack adapter 20 includes tubular adapter arm 21 to which first cross member engagement foot 24 and second cross member engagement foot 25 extend. First cross member engagement foot 24 includes first trailer hitch tubular cross member engagement end 26 and second cross member engagement foot 25 includes second trailer hitch tubular cross member engagement end 27. First cross member engagement foot 24 is shown inserted into the end of tubular cross member C and engagement member E of jack J engages first end 22 of adapter arm 21.

Figure 12:
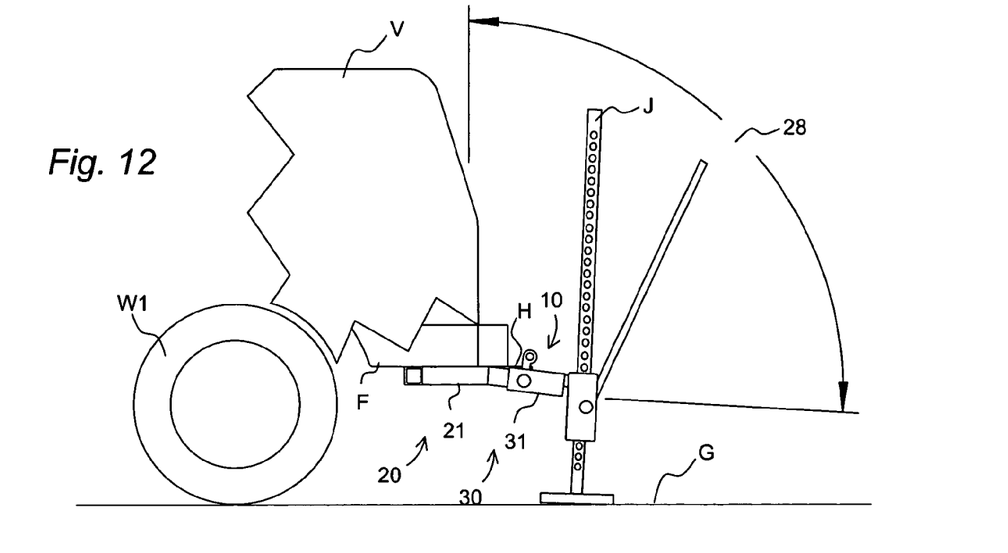
FIGS. 12 and 13 are representative side elevations of a trailer hitch crossbar jack adapter according to a preferred embodiment of the present invention being employed to adapt a jack for lifting a rear corner of a vehicle.
Figure 13:
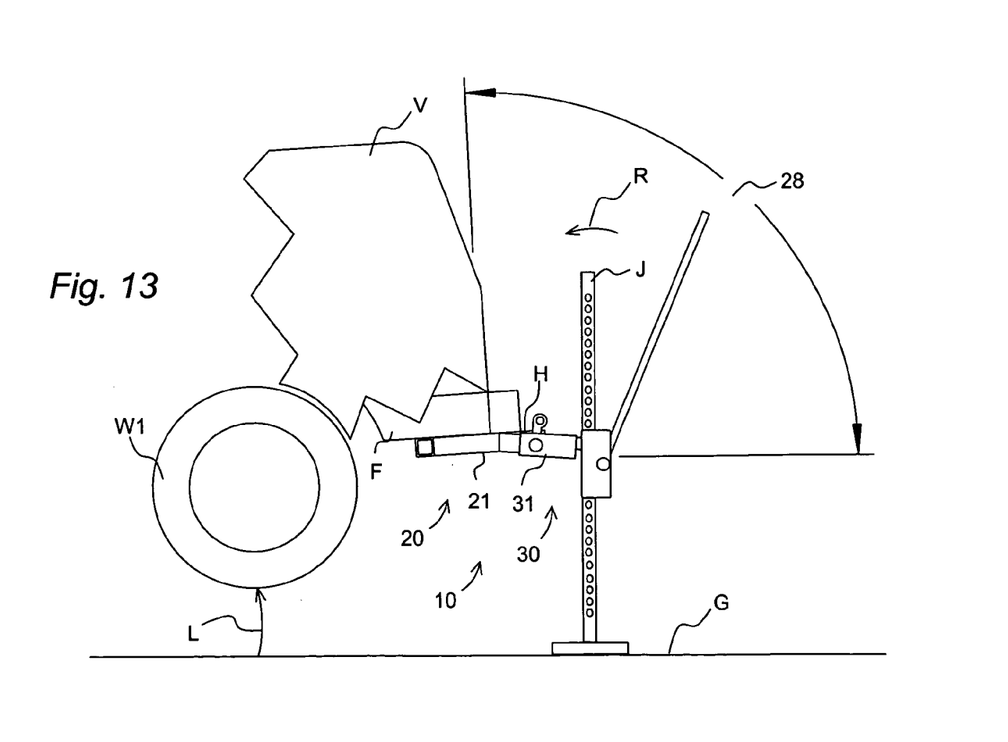

Referring to FIGS. 12 and 13, vehicle V is shown in a side partial cutaway view showing trailer hitch H attached to frame F. Trailer hitch jack adapter 20 is shown attached to trailer hitch H which is affixed to frame F. It will be noted that in the preferred embodiment, adapter arm 21 is configured having angle 28 located at along its length that provides an improved angular relationship between adapter arm 21 and jack J as seen illustrated in FIGS. 12 and 13. In FIG. 12, adapter arm 21 has a downward inclination while as vehicle V is lifted, as shown in FIG. 13, so that as wheel W1 raises from the ground as indicated generally by the arrow and reference character L, adapter arm 21 assumes an attitude that may be characterized as generally parallel to ground G.

Figure 14:
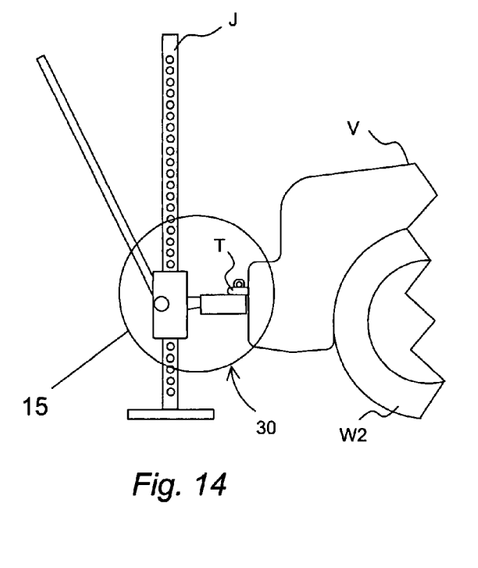
FIG. 14 is a representative side elevation of a towing lug jack adapter according to a preferred embodiment of the present invention being employed to adapt a jack for lifting a front corner of a vehicle.
Figure 15:
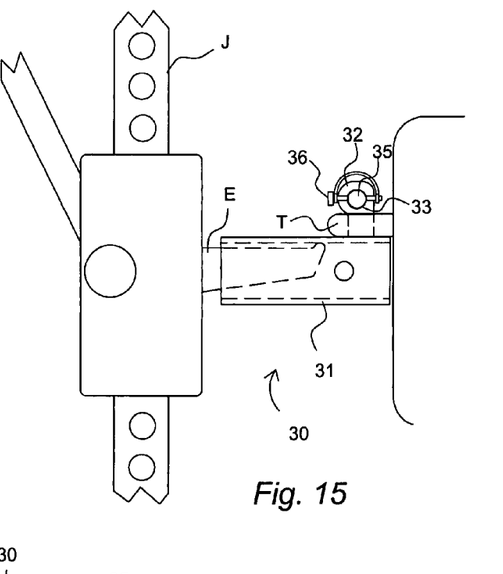
FIG. 15 is a representative side elevation of a towing lug jack adapter according to a preferred embodiment of the present invention being employed to adapt a jack for lifting a front corner of a vehicle.
Figure 16:
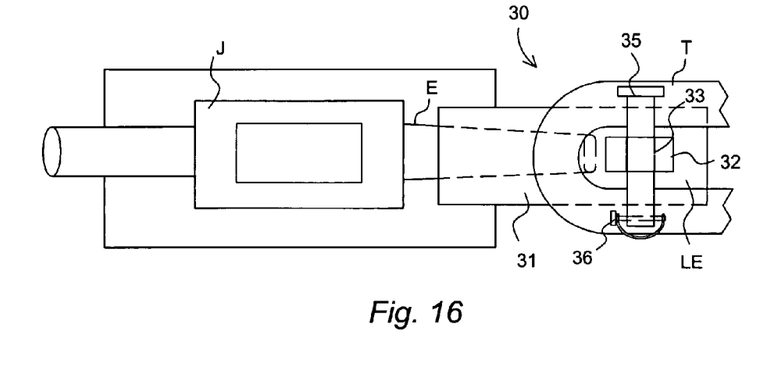
FIG. 16 is a representative top elevation of a towing lug jack adapter according to a preferred embodiment of the present invention being employed to adapt a jack to a towing lug.

Referring to FIG. 14, towing lug adapter portion 30 is shown connected to towing lug T and engaging jack J for lifting wheel W2 of vehicle V. FIGS. 15 and 16 shows a detail of lift engagement element E of jack J engaging includes towing lug jack adapter tubular section 31. Towing lug eye engagement element 32 is attached to and extends from towing lug jack adapter tubular section 31. Towing lug eye engagement element 32 includes aperture 33 formed through lug eye engagement element 32. As seen in FIG. 16, towing lug eye engagement element 32 extends through lug eye LE of towing lug T. Pin 35 is inserted through aperture 33 to retain towing lug jack adapter tubular section 31 on towing lug T when jack J exerts an upward force against towing lug T. Retainer pin and bale 36 may be placed through pin 35 to prohibit pullout of pin 35 during lifting.

While this invention has been described with reference to the detailed embodiments, it is not intended that this description be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A trailer hitch crossbar jack adapter for connecting a jack including a lift engagement element to a vehicle including a trailer hitch, the trailer hitch including a tubular cross member, the trailer hitch crossbar jack adapter comprising:
   an adapter arm including a first end and a second end, the adapter arm including an angle formed along the length of the adapter arm, the first end of the adapter arm configured to engage the lift engagement element of the jack; and
   a first cross member engagement foot connected to and extending from the second end of the adapter arm at an angle, the first cross member engagement foot including a first tubular cross member engagement end adapted for engagement with the trailer hitch tubular cross member.

2. The trailer hitch crossbar jack adapter of claim 1 further comprising a second cross member engagement foot connected to and extending from the second end of the adapter arm at an angle, the second cross member engagement foot including a second tubular cross member engagement end adapted for engagement with the trailer hitch tubular cross member.

3. The trailer hitch crossbar jack adapter of claim 1 wherein the first cross member engagement foot further comprises a rectangular cross-section.

4. The trailer hitch crossbar jack adapter of claim 1 wherein the first cross member engagement foot further comprises a circular cross-section and the trailer hitch crossbar jack adapter further comprises a pin insertable through a first aperture formed in the trailer hitch tubular cross member and a second aperture formed in the first cross member engagement foot.

5. The trailer hitch crossbar jack adapter of claim 1 wherein the first cross member engagement foot further comprises an elliptical cross-section.

6. The trailer hitch crossbar jack adapter of claim 1 wherein the first cross member engagement foot connects to and extends from the second end of the adapter arm at a right angle.

7. The trailer hitch crossbar jack adapter of claim 2 further comprising the first cross member engagement foot connecting to and extending from the second end of the adapter arm at a right angle.

8. The trailer hitch crossbar jack adapter of claim 2 further comprising the first cross member engagement foot connecting to and extending from the second end of the adapter arm at a right angle and the second cross member engagement foot connecting to and extending from the second end of the adapter arm at a right angle.

9. The trailer hitch crossbar jack adapter of claim 1 further comprising a towing lug adapter portion removably attachable to the adapter arm first end, the towing lug adapter portion including a towing lug jack adapter tubular section including a towing lug eye engagement element attached to and extending from the towing lug jack adapter tubular section, the towing lug eye engagement element including an aperture formed through the lug eye engagement element and a pin insertable through the lug eye engagement element for restricting pullout of the towing lug eye engagement element from the lug eye.

10. A combination jack adapter for connecting a jack including a lift engagement element to a vehicle including a trailer hitch having a tubular cross member or a towing lug, the combination jack adapter comprising:
   a trailer hitch crossbar jack adapter including an adapter arm having a first end and a second end, the first end of the adapter arm configured to engage the lift engagement element of the jack;
   a tubular first cross member engagement foot connected to and extending from the second end of the adapter arm at an angle, the first cross member engagement foot including a first trailer hitch tubular cross member engagement end adapted for engagement with the trailer hitch tubular cross member;
   a tubular second cross member engagement foot connected to and extending from the second end of the adapter arm at an angle, the second cross member engagement foot including a second trailer hitch tubular cross member engagement end adapted for engagement with the trailer hitch tubular cross member; and a towing lug adapter portion including a towing lug jack adapter tubular section removably attached to the adapter arm first end, the towing lug jack adapter tubular section including a towing lug eye engagement element attached to and extending from the towing lug jack adapter tubular section, the towing lug eye engagement element including an aperture formed through the lug eye engagement element and a pin insertable through the lug eye engagement element for restricting pullout of the towing lug eye engagement element from the lug eye.

11. The combination jack adapter of claim 10 wherein the first cross member engagement foot further comprises a rectangular cross-section.

12. The combination jack adapter of claim 10 wherein the first cross member engagement foot further comprises a circular cross-section.

13. The combination jack adapter of claim 10 wherein the first cross member engagement foot further comprises an elliptical cross-section and the jack adapter further comprises a pin insertable through a first aperture formed in the trailer hitch tubular cross member and a second aperture formed in the first cross member engagement foot.

14. The combination jack adapter of claim 10 wherein the first cross member engagement foot is connected to and extends from the second end of the adapter arm at a right angle and the second cross member engagement foot is connected to and extends from the second end of the adapter arm at a right angle.

15. The combination jack adapter of claim 10 wherein the adapter arm further comprises an angled adapter arm adapted to provide bumper clearance.

* * * * *